Aug. 16, 1932.   E. W. NILES ET AL   1,871,904
FREQUENCY CONVERTER
Filed March 13, 1929   2 Sheets-Sheet 1
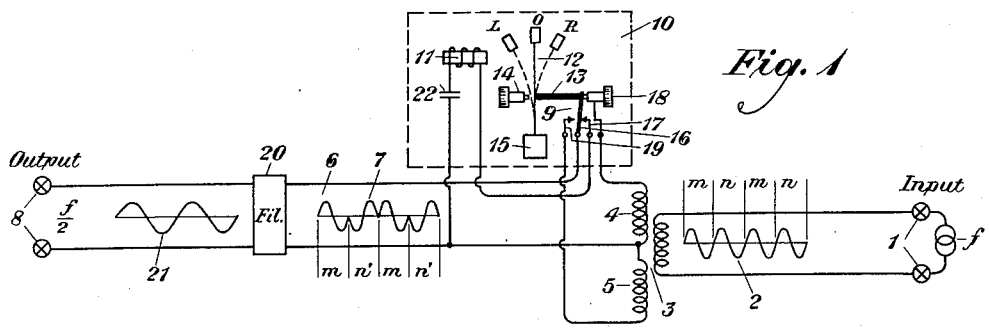
*Fig. 1*
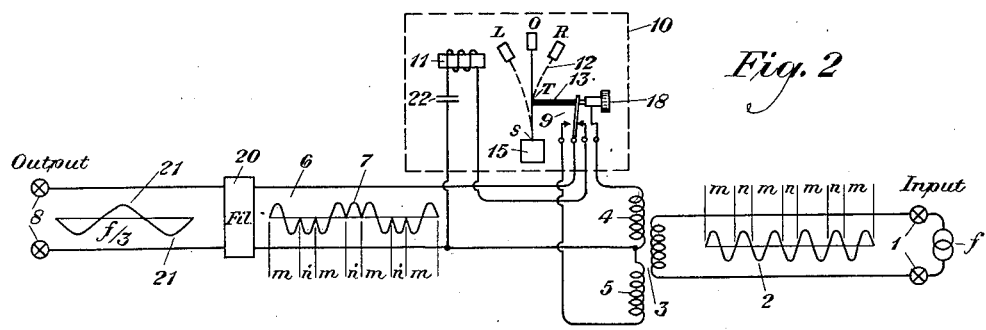
*Fig. 2*
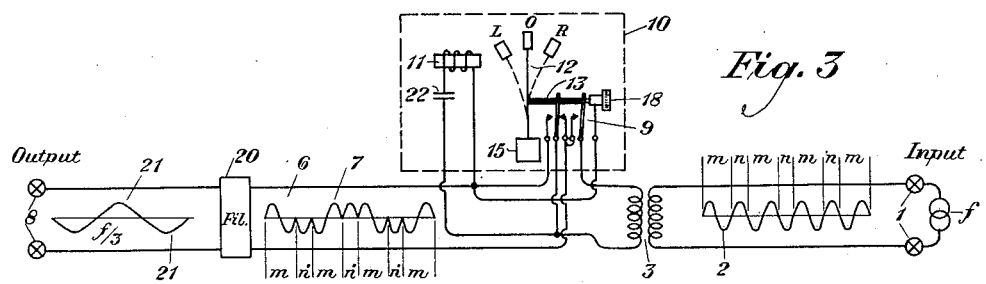
*Fig. 3*
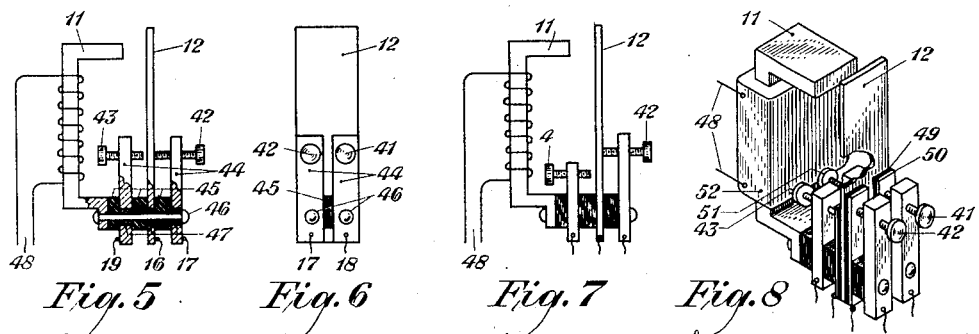
*Fig. 5*   *Fig. 6*   *Fig. 7*   *Fig. 8*
INVENTORS
E. W. Niles and W. H. Edwards
BY
ATTORNEY Aug. 16, 1932.    E. W. NILES ET AL    1,871,904
FREQUENCY CONVERTER
Filed March 13, 1929    2 Sheets-Sheet 2

INVENTORS
E. W. Niles and W. H. Edwards
BY
ATTORNEY

Patented Aug. 16, 1932

1,871,904

UNITED STATES PATENT OFFICE

ELIOT W. NILES, OF BLOOMFIELD, NEW JERSEY, AND WILLIAM H. EDWARDS, OF BAYSIDE, NEW YORK, ASSIGNORS TO AMERICAN TELEPHONE AND TELEGRAPH COMPANY, A CORPORATION OF NEW YORK

FREQUENCY CONVERTER

Application filed March 13, 1929. Serial No. 346,775.

This invention relates to frequency converters, and more specifically to devices of this type wherein current of a low frequency is obtained from a current source of some higher frequency. In particular, a primary object of the invention disclosed herein is to furnish means whereby a source of low frequency ringing current for use in telephone systems may be obtained from the 60-cycle alternating current supplied by the majority of the power and lighting companies.

In essence, the invention comprises electromagnetic means energized by current of the higher frequency to cause vibration at its natural periodicity, of a reed type armature mechanically tuned to a certain fractional frequency of that of the alternating current power supply. Switching means associated with the armature is so controlled thereby as to modify the impressed current wave and deliver to an output circuit current having for its fundamental the desired low frequency component required for ringing purposes.

In accordance with one feature of the invention a simple and efficient frequency converter is disclosed which utilizes all portions of the input current wave in producing the output current wave of the desired low frequency. By combining in one converter a simplicity of structure with an efficiency of operation the present device combines the good features of devices of this type known to the art, many of which are open to the objection either that they are complicated in structure or else inefficient in operation, due to the fact that they utilize only certain portions of the impressed wave in producing the desired low frequency wave.

In accordance with a second feature of the invention, a harmonic ringing system is disclosed adapted to produce from a single frequency source of current, a multiplicity of current sources, each of a frequency distinct from the others, whereby a plurality of ringing means associated with a given telephone line and each responsive to one of the frequencies aforesaid may be selectively operated in accordance with the particular frequency applied to the line.

Figure 4:
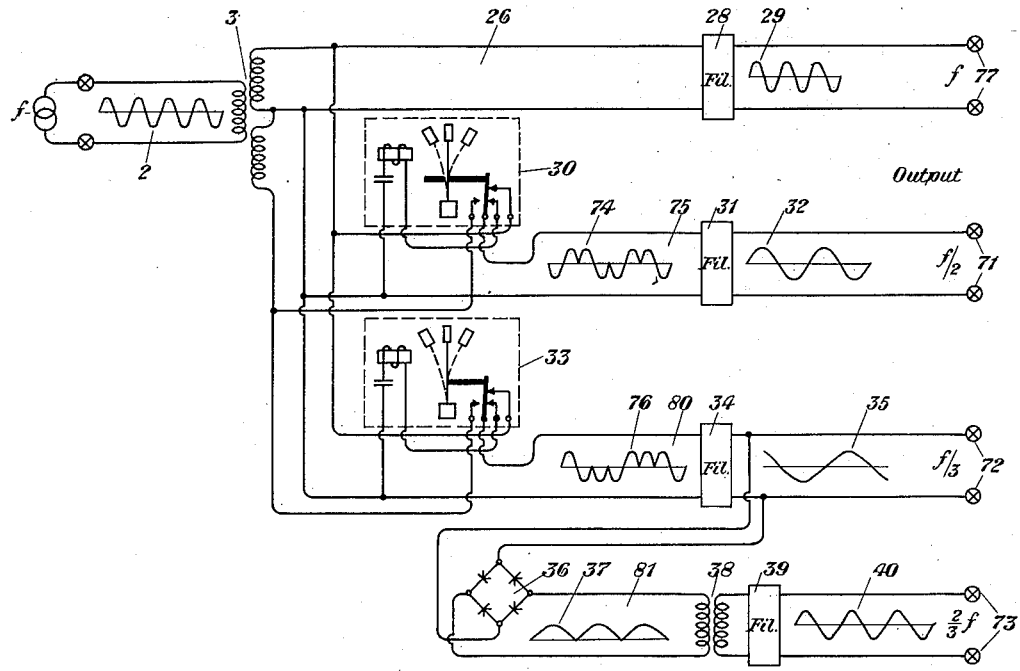
Figure 9:
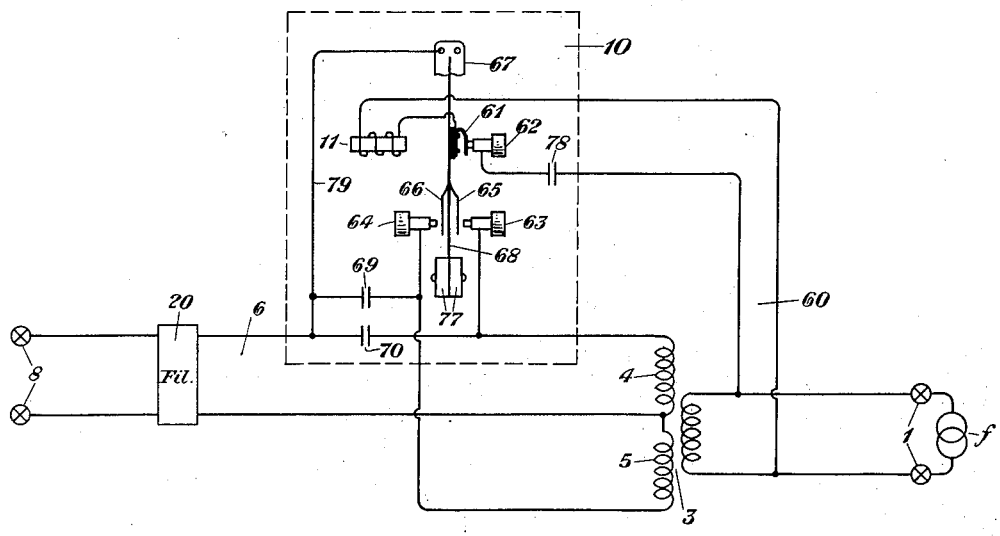

Other important features of the invention will appear more fully in the subsequent detailed disclosure given with reference to the drawings, of which Figure 1 shows in schematic form a frequency converter for changing current of a given frequency into current of half that frequency. Fig. 2 shows a converter very similar to that of Fig. 1 but adapted to transform current of a given frequency into current having one-third the initial frequency. Fig. 3 shows a second modification in schematic form for reducing current of a given frequency to one-third its initial frequency. Fig. 4 shows in schematic form a circuit arrangement for obtaining from a single frequency current source, a multiplicity of current sources each of a distinct frequency for use in harmonic ringing systems. Figs. 5 and 6 disclose the structural features of a pole changing device of the type indicated schematically in Fig. 1, while Figs. 6 and 7 disclose the structural features of a pole changing device illustrated in connection with Fig. 2. Figs. 5 and 7 are side elevations of the devices in question, Fig. 5 being shown partly in cross-section to illustrate the assembly thereof. Fig. 6 is an end view of the devices as viewed from the right in Figs. 5 and 7, respectively. Fig. 8 discloses in perspective the pole changing device illustrated schematically in connection with Fig. 3. Fig. 9 shows a modified circuit arrangement for obtaining the operative characteristics illustrated in connection with Figs. 1 and 2.

Referring now to Fig. 1, the converter comprises an input circuit 1, a three-winding transformer 3, a pole changing device 10 and an output circuit 6 having suitable filter means 20 associated therewith. The pole changing device 10 is illustrated very schematically in the drawings, which is intended to illustrate principally the switching operations accomplished by the device. The structural features of the pole changer whereby these switching operations are accomplished will be pointed out subsequently in the disclosure. The device 10 comprises an electromagnet 11 adapted to energize a reed-type armature 12, which latter is affixed to a rigid base 15 and is mechanically tuned to vibrate between stops 13 and 14 at a natural periodicity half that of the periodicity of the source of input current. The reed 12 is normally in position O, but during operation vibrates between the extreme positions L and R. The elements 14 and 18 are screw stops screw-threaded through rigid members (not shown). These stops may be adjusted for satisfactory operation of the device by suitably screwing in or out on the same. Stop 18 is initially adjusted so that with reed 12 in its normal position O, as shown, the reed presses against the rigid member 13 sufficiently to operate switch 9 against its right contacts. This connects winding 4 of transformer 3 to the output circuit 6 and also to the magnet 11. Switch 9 will be operated in this manner for any position of the reed 12 to the right of the intermediate position O. Upon deflection of the reed to the left of the intermediate position O, however, switch 9 is operated against its left contacts, which opens the circuit connecting output circuit 6 and magnet 11 with transformer winding 4, and completes a circuit connecting transformer winding 5 to the output circuit 6. Windings 4 and 5 of transformer 3 are connected series-aiding so that for current of a given polarity flowing in the primary winding thereof, the operation of switch 9 will reverse the polarity of current delivered through the transformer to the output circuit 6.

The operation of the device is as follows: Assume that a source of current of single frequency $f$ is connected to input terminals 1, thus impressing the current wave train 2 upon the primary winding of the transformer 3. The resulting current induced in the secondary winding 4 of the transformer will flow through the winding of magnet 11, energizing the same and starting the reed 12 to vibrate. Reed 12 upon thus being energized, will vibrate at its natural periodicity of $$\frac{f}{2}$$

between the extreme positions L and R. The stop 14 is so adjusted that the reed requires the same interval of time for making an excursion to the right of the intermediate position O that is required for making an excursion to the left thereof. Under this condition switch 9 will be operated against its right contacts during one-half of each cycle of vibration of the reed, and against its left contacts during the remaining half cycle thereof. The magnet 11 is, of course, energized only during the interval that the reed is making an excursion to the right of the intermediate position and merely serves to maintain the reed in continuous vibration at its natural periodicity of $$\frac{f}{2}.$$

By inserting a condenser 22 of suitable capacity in series with magnet 11 the phase relations may be so adjusted that once the steady-state condition of vibration is set up, each passage of reed 12 through its intermediate position O to commence a new excursion to the right or left thereof, will occur at an instant when the current magnitude of wave train 2 has a zero value. Furthermore, since the reed 12 vibrates at half the periodicity of the impressed wave train 2, a complete cycle of current will be impressed upon the transformer 3 during each excursion of the reed 12 to the right or left of its intermediate position O. Now, during each excursion of the reed to the right of position O, switch 9 is operated to the right, hence a cycle of current from wave train 2 is impressed through transformer winding 4 upon output circuit 6, whereas during each excursion of the reed to the left of position O, a cycle of the input current is transmitted through transformer winding 5 to the output circuit 6.

Now, it was pointed out above that the function of transformer windings 4 and 5 is to furnish means for reversing the polarity of current delivered to the output circuit. Thus, if it is assumed that winding 4 is so connected as to transmit current from source $f$ unmodified to the output circuit, winding 5 will transmit the current reversed in phase, i. e., displaced in phase relation by 180° as compared to the unmodified current. Hence, as a result of the switching operations explained above, the cycles $m$ of wave train 2 will be transmitted unmodified to the output circuit and will constitute the cycles $m$ of the resulting wave train 7 delivered thereto, whereas the alternate cycles $n$ of wave train 2 will be transmitted to the output circuit reversed in phase relation compared to the unmodified current and will comprise the cycles $n'$ of wave train 7.

If, now, the wave train 7 is compared with wave train 2, it will be observed that the former repeats itself at half the periodicity of the latter and hence, in accordance with the methods of the Fourier analysis, wave train 7 must contain a fundamental frequency component which is half that of wave train 2.

In this case the fundamental frequency of wave train 7 would be $$\frac{f}{2},$$

together with certain harmonics of the fundamental. These harmonic frequencies may be eliminated by passing the output current 7 through a suitable filter 20 adapted to suppress all frequencies except the fundamental frequency $\frac{f}{2}$. In this way an approximately pure sine wave train 21 having the frequency $\frac{f}{2}$ may be delivered to the output terminals 8.

Fig. 2 shows a modification of Fig. 1 for obtaining the frequency $\frac{f}{3}$, from a source of current having a frequency $f$. In this case the stop 14 of Fig. 1 is omitted so that the reed 12 vibrates freely in making an excursion to the left of position O but is restrained by the stop 13 in making an excursion to the right of the intermediate position O. The reed in this case will thus have a compound mode of vibration since its periodicity during an excursion to the left of position O will be determined by the length of the reed OS, and during an excursion to the right of the intermediate position its periodicity will be determined by the length OT. Since the periodicity of vibration of a reed of this type is an inverse function of its length, by locating the stop 13 at a suitable height above the rigid supporting member 15, the reed can be made to require twice the time interval for making an excursion to the left of position O that is required for making an excursion to the right thereof. Assuming that this condition is satisfied and that the reed is mechanically tuned to vibrate at a natural periodicity of $\frac{2f}{3}$, the circuit of Fig. 2 will thus be adapted to convert a frequency $f$ into a frequency $\frac{f}{3}$.

In order to make the device self-starting, the stop 18 is so adjusted that switch 9 is operated to the right with the reed in its intermediate position O. If, now, a source of current of single frequency $f$ is connected to the input terminals 1, a wave train 2 will be produced which will cause vibration of the reed 12 at its natural periodicity of $\frac{2f}{3}$. By means of a suitable capacity 22 in series with the magnet 11, the phase relations may be so adjusted that with the reed in continuous vibration it passes through its intermediate position O in each case just as the current magnitude in the wave train 2 passes through a zero value.

The operation of the circuit is as follows: Assume that the reed is in continuous vibration at its maximum amplitude and is passing through its intermediate position O toward the left just as the initial portion of wave train 2 is impressed upon the transformer 3. Since, now, the reed 12 has a natural periodicity of $\frac{2f}{3}$ and requires two-thirds of its total period of vibration in making an excursion to the left of the intermediate position O, a period of time equal to $\frac{1}{f}$ will elapse before the reed again passes through the intermediate position toward the right. During this entire interval switch 9 will be operated against its left contact so that the first complete cycle $m$ of wave train 2 will be delivered unmodified to the output circuit 6 through the lower winding of transformer 5, and will constitute the first cycle $m$ of wave train 7. At the end of this first cycle the reed 12 will have completed its excursion to the left and will be passing through its intermediate position on an excursion toward the right. The time required for making the excursion toward the right will, for reasons explained above, be $\frac{1}{2f}$, and since during this entire interval the switch 9 will be operated against its right contacts, the first half cycle $n$ of wave train 2 will be delivered to the output circuit 6, reversed in phase as compared to the first cycle $m$, and hence will constitute the first half cycle $n'$ of wave train 7. By a continuation of this method of operation it will be seen that all of the cycles $m$ of wave train 2 will be delivered unmodified to the output circuit 6 to constitute the cycles $m$ of wave train 7 flowing therein. Each of the cycles $m$ of wave train 2, however, will be transmitted reversed in phase as compared to the unmodified current, and will thus produce the half cycles $n'$ of wave train 7. As a result of this process of operation it will be seen that the wave train 7 formulated in the output circuit repeats itself at one-third the periodicity of wave train 2 and, in accordance with the Fourier analysis, therefore, contains the fundamental frequency $\frac{f}{3}$, together with certain harmonics thereof. By passing this output current through a suitable filter 20 adapted to suppress these harmonics, an approximately pure sine wave of output current 21 having a frequency $\frac{f}{3}$ may be delivered to the output terminals 8.

The circuit of Fig. 3 accomplishes the same result as that of Fig. 2. The only difference between the two circuits consists in the use in Fig. 3 of a two-winding transformer 3 instead of a three-winding transformer as formerly, which, of course, necessitates the use of additional contacts on the switch 9 to suitably reverse the current polarity in the output circuit at the proper moments. The reed 12 of Fig. 3 is mechanically tuned to have a natural periodicity of $\frac{2f}{3}$, where $f$ is again the frequency of the input current, and the stop 13 is located at such a height as to cause the reed to require twice the time in making an excursion to the left of position O as is required for making an excursion to the right thereof. With the circuit properly adjusted as explained above, and with the reed vibrating continuously, the cycles $m$ of the input current wave train 2 are transmitted unmodified to produce the cycles $m$ of wave train 7 in the output circuit 6. Owing to the switching operations at the proper instant, the half cycles $n$ of the input wave train 2 are transmitted reversed in phase to the output circuit to produce the half cycles $n'$ in wave train 7.

Fig. 4 shows a frequency converting system for producing from a single current source of frequency $f$, a multiplicity of current sources each adapted to supply one of the following frequencies:

$$\frac{f}{3}, \frac{f}{2}, \frac{2f}{3}, \text{ and } f.$$

With a 60 cycle source of current supplying the system, ringing currents of 20, 30, 40 or 60 cycles may be thus obtained, which are suitable frequencies for a harmonic ringing system.

Referring to the drawings, the current source of frequency $f$ supplies a current wave train 2 to the primary of transformer 3. Associated with the upper secondary winding thereof is an output circuit 26 for supplying current of frequency $f$ to output terminals 77. A filter 28 may be interposed in the output circuit for suppressing any harmonics of the frequency $f$ which may be present in the current source $f$, thus ensuring an approximately pure single frequency wave train 29 in the output circuit.

Associated with the secondary windings of transformer 3 are pole changing devices 30 and 33. Device 30 is similar to that disclosed in Fig. 1, and is adapted to produce in an output circuit 75 a wave train 74 having the fundamental frequency $\frac{f}{2}$. The filter 31 suppresses the harmonic frequency and causes the delivery to output terminals 71 of an approximately pure wave train 32 of frequency $\frac{f}{2}$. In a similar manner device 33, which is similar to that disclosed above in Fig. 2, produces in an output circuit 80 a wave train 76 having the fundamental frequency $\frac{f}{3}$. Filter 34 suppresses the harmonics thereof and delivers wave train 35 of frequency $\frac{f}{3}$ to output terminals 72.

In order to obtain the frequency $\frac{2f}{3}$, a portion of the current delivered to terminals 72 is tapped off and passed through the full wave rectifier 36, which causes delivery to the output circuit 81 of a unidirectional wave train 37 which pulsates between zero and a maximum value at double the frequency of wave train 35, i. e., once for each half cycle thereof. The wave train 37 pulsating at frequency $\frac{2f}{3}$ is converted into alternating current of that frequency by passing the same through a transformer 38, the well known action of which requires no explanation. The harmonic frequencies are eliminated by means of filter 39, for delivering to the output terminals 73 the approximately pure wave train 40 of frequency $\frac{2f}{3}$.

Figs. 5 and 6 disclose an electromagnetic structure of the type indicated schematically in Fig. 1. In Fig. 5, which shows a side elevation of the structure, partly in cross-section, the magnet 11 is energized by current supplied to the winding thereof over leads 48. The magnet in turn energizes the reed-type armature 12, of magnetic material, and causes it to vibrate between the stops 41 to 43, inclusive, at a natural periodicity equal to half the frequency of the current supplied to the winding of the magnet. From Fig. 6, which shows an end view of the device as viewed from the right in Fig. 5, it will be seen that there are two stops 41 and 42 which make contact with the right side of the reed 12. Each of these stops is screw-threaded through a rigid conductive member 44, the stops being adjusted to make contact with the reed 12 in the normal position, as shown in Fig. 5. The stop 43 which makes contact with the left side of the reed 12 is also screw-threaded through a rigid conductive member 44 and is adjusted to be out of contact with the reed in its normal position, as shown. The stops and the reed are maintained in proper operative positions relative to the electromagnet and to each other by means of the insulating spacing members 45 and the rivets 46 extending through the elements mentioned and maintaining the device in rigid assembly by means of the rivet heads, as shown. The insulating sleeves 47 prevent the rivets 46 from coming into contact with the supporting members 44 or the reed 12. The stops 41 and 42 constitute the two make contacts on the right of switch 9 (Fig. 1), while stop 43 is the make contact on the left. In Fig. 5 the reed is the movable switch arm of switch 9 (Fig. 1). The numbering of the contact arms 16 to 19, inclusive, of Fig. 1 is the same as that shown for the corresponding elements in Fig. 5. By adjusting the screws 41 to 43 (Figs. 5 and 6) it is possible to impart the proper operating characteristics to the pole changing device.

Fig. 7 shows a side elevation of a device such as that indicated schematically in Fig. 2. The end view of this device as viewed from the right in Fig. 7 is shown in Fig. 6. Stops 41 and 42, which are placed at the same height on the reed, constitute the two right make contacts, while stop 43 constitutes the left make contact. Stop 43 makes contact at a lower point on the reed than stops 41 and 42, the relative positioning of the stops being so determined that the reed in vibration will remain on the stop 43 for a period twice as long as that in which it is in contact with stops 41 and 42. The reed, of course, under these conditions, is mechanically tuned to vibrate between the stops at a natural periodicity of vibration equal to two-thirds the frequency of the current which it is designed to modify.

Fig. 8 shows a perspective drawing of a pole changing device such as that indicated schematically in Fig. 3. It will be seen from Fig. 3 that the switch 9 requires two movable switch arms, two make contacts on the right and two make contacts on the left, which, of course, complicates the structural details of the pole changing device adapted to accomplish the switching operations required. In Fig. 8 the vibrating reed is again indicated at 12, the magnet 11 having the winding 52 thereon with terminals 48. There are two stops 41 and 42 on the right, screw-threaded through supporting members individual thereto, and two stops 43 and 51 on the left, also screw-threaded through supporting members individual thereto. Each stop, such as 41, makes contact with a conductive strip 50 which is rigidly affixed to the reed 12 but is insulated therefrom by means of an insulating strip 49 separating the reed from the conductive strip. As the reed vibrates to the right it thus completes a circuit through each stop 41 and 42 and its corresponding conductive strip. Similarly, as the reed vibrates to the left it completes a circuit through each stop 43 and 51 and its corresponding conductive strip. Stops 43 and 51 make contact lower on the reed than stops 41 and 42 in order that the reed in vibrating will be in contact with the former during the two-thirds of each period of vibration and in contact with the latter one-third thereof.

Fig. 9 shows a modified circuit arrangement which will transform the input current in accordance with the methods indicated in Figs. 1 or 2, as desired, i. e., it will produce a current of half the initial frequency or one-third the initial frequency dependent upon the adjustment of the device. The circuit arrangement of Fig. 9 comprises an input circuit 1, an output circuit 6 and a three-winding transformer 3 connecting the same through contacts of the pole changing device 10. The pole changing device 10 comprises a mechanically tuned reed 68 rigidly affixed at one end to a supporting member 67. Affixed to the reed are two light and flexible spring contacts 65 and 66, each of which makes contact with the corresponding stops 63 and 64, which stops are screw-threaded through rigid members (not shown) in order that they may be given any desired adjustment with respect to the spring contacts. Stop 63 is connected to the upper terminal of winding 4, and stop 64 to the lower terminal of winding 5, of transformer 3. The reed is actuated by a magnet 11 which is connected across the input circuit 1 by means of leads 60, as shown, whereby the magnet is energized by current supplied from the source $f$. The circuit containing the magnet 11 is traced through a third light, flexible contact 61 affixed to reed 68 and through a stop 62 which is screw-threaded through a supporting member (not shown) and which, in order to make the device self-starting, is adjusted until it makes contact with the spring 61, with the reed in the normal position, as shown in the drawings.

A vibratory structure of the type outlined in connection with Fig. 9 is fully discussed in the U. S. Patent No. 1,292,815 to O. M. Leich, dated January 28, 1919. The device in question bears the number 38 in Fig. 2 of the drawings accompanying that patent.

If it is desired to utilize the circuit of Fig. 9 for obtaining a current supply in the output circuit which has half the frequency of the source 69, the reed 68 is mechanically tuned by adjusting the mass 77 to have a natural periodicity of vibration equal to half that of the current from the source $f$. With the reed in the position shown, the stops 63 and 64 are backed off slightly from the springs 65 and 66 so as to be slightly out of contact therewith. With this arrangement the vibration of the reed at its natural periodicity will cause stop 63 to make contact with spring 65 during substantially half of each cycle of vibration, and will cause stop 64 to make contact with spring 66 during the remaining half of each cycle of vibration. While, therefore, the reed is making an excursion to the right of the position shown, a circuit will be traced from the lower conductor of pair 6, through winding 4 of the transformer 3, stop 63 and spring 65, through the conductive reed 68 to the supporting member 67, which is also conductive, and thence over lead 79 to the upper conductor of pair 6. While the reed is making an excursion to the left of the initial position the above traced circuit will be open, and a second circuit will be traced from the lower lead of pair 6, through winding 5 of transformer 3, stop 64, spring 66, reed 68, and over lead 79 to the upper conductor of pair 6. It will thus be seen that the vibration of the reed reverses at the end of each cycle the polarity of current delivered to the output circuit, in the same manner as is indicated for wave train 7 of Fig. 1. By means of a suitable condenser 78 in series with magnet 11 the phase relations may be so adjusted that the reed 12 during vibration will pass through its intermediate position just as the current from source $f$ passes through its zero value, starting upon a new cycle.

If it is desired to obtain an output current in circuit 6 having one-third the frequency of the source $f$, the reed 68 is mechanically tuned by adjusting mass 77 to have a natural periodicity of vibration equal to two-thirds that of the source $f$. In this case the stops 63 and 64 are so adjusted that the stop 63 will be in contact with spring 65 during substantially one-third of each period of vibration of the reed 68, while stop 64 will be in contact with spring 66 the remaining two-thirds of the cycle. By adjusting the phase relations in the manner explained above by means of a suitable condenser 78, the reed 68 during vibration can be made to perform its switching operations in each case just as the current from the source $f$ is passing through a zero value. Under these conditions a complete cycle of unmodified current from the source $f$ will be delivered to the output circuit during each interval that stop 64 is in contact with spring 66, whereas during each interval that stop 63 is in contact with spring 65, a half cycle of current from the source $f$ will be delivered to the output circuit 6 reversed in phase as compared to the unmodified current. Thus, a wave train will be delivered to the output circuit 6 which is similar to wave train 7 of Fig. 2. By means of a suitable filter 20 interposed in the output circuit, the harmonics in the output current supply may be suppressed and a pure sine wave of the fundamental frequency obtained.

It is obvious, of course, that the pole changing device 10 of Fig. 9 may be modified to obtain the switching operations accomplished by the circuit of Fig. 3. The only change required would consist in the addition to reed 68 of two more spring contacts similar to 65 and 66, together with their corresponding screw stops similar to 63 and 64. The additional spring contacts would be strapped together and insulated from the reed 68. The method of connecting such a device for operation is, of course, obvious from the schematic circuit of Fig. 3.

The condensers 69 and 70 of Fig. 9 are connected between stop 64 and spring 66, and stop 63 and spring 65, respectively, in order to prevent arcing at the contacts during operation of the device 10.

What is claimed is:

1. A frequency converter comprising in combination with a source of alternating current, a current delivery circuit, a reed whose natural periodicity is different from that of the current from said source and operable thereby to vibrate at its own periodicity, current modifying means associating said current source with said delivery circuit, said reed when so vibrated so controlling said means as to cause current from said source to be delivered to said circuit unmodified during a definite portion of each vibration period and to be delivered thereto reversed in phase as compared to the unmodified current during the remainder of each said period, whereby the current flowing in said delivery circuit contains frequencies different from said source.

2. A frequency converter comprising in combination with a source of alternating current, a current delivery circuit, a reed whose natural periodicity is different from that of the current from said source and operable thereby to vibrate at a fractional rate thereof, current modifying means associating said source with said circuit, said reed when so vibrated so controlling said means as to cause current from the said source to be delivered to said circuit unmodified during a definite portion of each vibration period and to be delivered thereto altered in phase relation compared to the unmodified current during the remainder of each said period, for causing the current flowing in said circuit to have a fractional frequency operative characteristic compared to the unmodified current.

3. A frequency changing device comprising in combination with a source of alternating current, a reed mechanically tuned to have a natural periodicity of vibration different from the periodicity of alternation of said current, and operable thereby to vibrate at a fractional rate thereof, a current delivery circuit and current modifying means associating the same with said source, said reed when so vibrated so controlling said means as to cause current from said source to be delivered unmodified to said circuit during a definite portion of each reed vibration and to be delivered reversed in phase relation as compared to the unmodified current during the remainder of each said vibration, for imparting to the resultant current flowing in said delivery circuit a fractional frequency operative characteristic to the unmodified current from said source.

4. In an alternating current system, the combination with a source of alternating current of a current delivery circuit, a reciprocable element whose natural periodicity is different from the periodicity of alternation of current from said source, and operable thereby to reciprocate at a fractional rate thereof, current modifying means between said source and said circuit, said reciprocable element when so operated so controlling said means as to cause current from said source to be delivered unmodified to said circuit during a definite portion of each reciprocation and to be delivered reversed in phase as compared to the unmodified current during the remainder thereof, for imparting to the resultant current flowing in said circuit a fractional frequency operative characteristic to the unmodified current.

5. In an alternating current system, the combination with a source of alternating current of a reciprocatory type of electrical motor, a delivery circuit, current modifying means operable by said motor associating said source with said circuit, said motor being operable by current from said source to reciprocate at a certain fractional frequency thereof, said current modifying means including means for causing current from said source to be delivered to said circuit unmodified during a definite portion of each reciprocation but to be delivered reversed in phase compared to the unmodified current during the remaining portion thereof, for imparting to the resultant current flowing in said circuit a fractional frequency operative characteristic to the unmodified current.

6. A frequency converter comprising in combination with a source of alternating current, a current delivery circuit, a reed whose natural periodicity is different from that of the current from said source and operable thereby to vibrate at a fractional rate thereof, current modifying means associating said source with said circuit, said reed when so vibrated so controlling said means during a definite portion of each period of vibration thereof as to cause current from said source to be delivered unmodified to said circuit, and so controlling said means during the remainder of each said vibration period as to cause current from said source to be delivered to said circuit reversed in phase compared to the unmodified current, for imparting to the current flowing in said circuit a fractional frequency operative characteristic compared to the unmodified current.

7. A frequency converter comprising in combination with a source of alternating current, a current delivery circuit, a reed whose natural periodicity is half that of the current from said source, and operable thereby to vibrate at said periodicity, switch controlled current modifying means associating said circuit with said source, said reed when so vibrated and adapted to operate said switch in one sense for half of each vibration period for causing the delivery of current from said source unmodified to said circuit, and adapted to further operate said switch in the opposite sense during each remaining half period vibration thereof for delivering current to said circuit reversed in phase compared to the unmodified current for imparting to the resultant current flowing in said circuit an operative characteristic having a frequency one-half that of the current from said source.

8. A frequency converter comprising in combination with a source of alternating current, a current delivery circuit, a reed whose natural periodicity is two-thirds that of the current from said source, and operable thereby to vibrate at said periodicity, switch controlled current modifying means associating said circuit with said source, said reed when so vibrated adapted to operate said switch in one sense during two-thirds of each vibration period thereof for causing current from said source to be delivered to said circuit unmodified, and adapted further to operate said switch in the opposite sense during the remaining one-third of each vibration period for causing said current to be delivered to said circuit reversed in phase compared to the unmodified current for imparting to the resultant current flowing in said circuit an operative characteristic having a frequency one-third that of the current from said source.

In testimony whereof, we have signed our names to this specification this 12th day of March, 1929.

ELIOT W. NILES.
WILLIAM H. EDWARDS.